United States Patent
Aono et al.

(10) Patent No.: US 8,071,498 B2
(45) Date of Patent: Dec. 6, 2011

(54) EXHAUST GAS PURIFYING CATALYST, METHOD FOR RECOVERING EXHAUST GAS PURIFYING CATALYST, AND CATALYST SYSTEM FOR EXHAUST GAS PURIFICATION

(75) Inventors: Norihiko Aono, Shizuoka (JP); Yoshinori Yamashita, Shizuoka (JP)

(73) Assignee: Cataler Corporation, Kakegawa-Shi, Shizuoka (JP)

( * ) Notice: Subject to any disclaimer, the term of this patent is extended or adjusted under 35 U.S.C. 154(b) by 0 days.

(21) Appl. No.: 12/297,660

(22) PCT Filed: Apr. 20, 2007

(86) PCT No.: PCT/JP2007/058638
§ 371 (c)(1), (2), (4) Date: Oct. 20, 2008

(87) PCT Pub. No.: WO2007/123205
PCT Pub. Date: Nov. 1, 2007

(65) Prior Publication Data
US 2009/0099005 A1    Apr. 16, 2009

(30) Foreign Application Priority Data
Apr. 21, 2006 (JP) ................... 2006-117958

(51) Int. Cl.
*B01J 29/06* (2006.01)
*B01J 23/38* (2006.01)
*B01J 23/10* (2006.01)

(52) U.S. Cl. ............ 502/73; 502/74; 502/240; 502/242; 502/250; 502/303; 502/304; 502/325; 502/328; 502/332; 502/333; 502/334; 502/339; 502/340; 502/341

(58) Field of Classification Search ............... 502/73, 502/74, 240, 242, 250, 252, 302, 303, 304, 502/325, 328, 332, 333, 334, 339, 340, 341
See application file for complete search history.

(56) References Cited

U.S. PATENT DOCUMENTS

| 6,461,579 B1 | 10/2002 | Hachisuka et al. |
| 6,620,392 B2 | 9/2003 | Okamoto et al. |
| 6,866,834 B2 | 3/2005 | Nakamura et al. |
| 2001/0022956 A1 * | 9/2001 | Okamoto et al. ......... 423/213.5 |

FOREIGN PATENT DOCUMENTS

| CN | 1724154 A | 1/2006 |
| EP | 1340537 A1 | 9/2003 |
| JP | 8-144748 | 6/1996 |
| JP | 11-226404 | 8/1999 |
| JP | 2000-61268 | 2/2000 |
| JP | 2001-310131 | 11/2001 |
| JP | 2002-115534 | 4/2002 |
| JP | 2002-126453 | 5/2002 |
| JP | 2002-166170 | 6/2002 |
| JP | 2002-336700 | 11/2002 |
| JP | 2003-311152 | 11/2003 |
| JP | 2006-43637 | 2/2006 |

OTHER PUBLICATIONS

Office Action dated Jun. 25, 2010 issued in Korean Patent Application No. 10-2008-7023989 with an English translation. 4 pages.
The Patent Office of the People's Republic of China, The First Office Action. Application No. 200780012704.9. Dated Nov. 12, 2010, Chinese and English Translation.

* cited by examiner

*Primary Examiner* — Elizabeth Wood
(74) *Attorney, Agent, or Firm* — Davis & Bujold, P.L.L.C.

(57) ABSTRACT

An exhaust gas purifying catalyst wherein the catalytic activity can be recovered over a wide temperature range is provided. Also provided are a method for recovering an exhaust gas purifying catalyst, and a catalyst system for exhaust gas purification. The exhaust gas purifying catalyst is characterized by containing an oxide A containing an oxide (A-1) containing an alkaline earth metal and/or a rare earth metal and an inorganic oxide (A-2), and a noble metal B supported by the oxide A. This exhaust gas purifying catalyst is also characterized in that the weight ratio of the oxide (A-1) containing an alkaline earth metal and/or a rare earth metal to the noble metal B is from 1:10 to 1:500.

14 Claims, 5 Drawing Sheets

EXHAUST GAS PURIFYING CATALYST, METHOD FOR RECOVERING EXHAUST GAS PURIFYING CATALYST, AND CATALYST SYSTEM FOR EXHAUST GAS PURIFICATION

TECHNICAL FIELD

The present invention relates to an exhaust gas purifying catalyst that removes toxic substances contained in exhaust gas from an internal combustion engine of an automobile, a motorcycle, and others. The present invention also relates to a method for recovering the exhaust gas purifying catalyst, and a catalyst system.

BACKGROUND ART

Conventionally, an exhaust gas purifying catalyst for use in an automobile or the like is known to include an oxide of alkali earth and rare earth supported by a noble metal such as Pt, Rh, Pd, and others.

While the above exhaust gas purifying catalyst processes an exhaust gas, sintering sometimes occurs to the noble metal (especially Pt), which results in deterioration in catalytic activity. In such cases, an oxidation treatment process and a reduction treatment process are applied after processing of the exhaust gas. There is a proposal for a method for recovering the catalytic activity in that manner (see Patent Literature 1).

Patent Literature 1: Unexamined Japanese Patent Publication No. 8-144748

DISCLOSURE OF THE INVENTION

Problems to be Solved by the Invention

However, if the exhaust gas temperature in the oxidation treatment process is low when the above method for recovering the catalyst is performed, the noble metal remains coagulated. Moreover, different from the case of temporary deterioration, the catalytic performance has sometimes never been recovered. Therefore, there is a problem that the exhaust gas temperature must be strictly controlled when the oxidation treatment process is performed. Especially in a diesel engine, the exhaust gas temperature seldom becomes 600° C. or above at normal driving in an urban area. It was difficult to apply the recovery method to a diesel vehicle.

The present invention has been made in view of the above points. An object of the present invention is to provide an exhaust gas purifying catalyst that can recover the catalytic activity over a wide temperature range, a method of recovering an exhaust gas purifying catalyst, and a catalyst system for exhaust gas purification.

Means to Solve the Problems (1) The invention according to the first aspect provides an exhaust gas purifying catalyst which includes: an oxide A containing an oxide (A-1) containing an alkaline earth metal and/or a rare earth metal and an inorganic oxide (A-2); and a noble metal B supported by the oxide A. A weight ratio of the noble metal B to the oxide (A-1) containing an alkaline earth metal and/or a rare earth metal is from 1:10 to 1:300.

The exhaust gas purifying catalyst of the present invention has the aforementioned composition, especially, the weight ratio of the noble metal B to the oxide (A-1) is from 1:10 to 1:300 (preferably from 1:30 to 1:200). Thus, the exhaust gas purifying catalyst of the present invention can inhibit coagulation of noble metal particles and recover the catalytic performance even if the catalyst temperature at an oxidation treatment process is low (600° C. or below, for example) when a recovery method is conducted. Accordingly, the exhaust gas purifying catalyst of the present invention can recover the catalytic activity by performing the oxidation treatment process by the exhaust gas having a temperature of 600° C. or below.

Generally, the exhaust gas temperature of an internal combustion engine is usually 600° C. or below. That is, in the case of a gasoline vehicle, the frequency at which the exhaust gas temperature becomes 600° C. or above at normal driving is very low in view of all the driving zones. Especially if there is high frequency of driving in a suburb, the exhaust gas temperature seldom reaches 600° C. Also, in the case of a diesel vehicle, the exhaust gas temperature is further low as compared to the case of a gasoline vehicle by 100° C. It is extremely rare that the exhaust gas temperature goes up to 600° C. or above.

As noted above, in the exhaust gas purifying catalyst of the present invention, the oxidation treatment process can be performed at low temperature. Accordingly, the oxidation treatment process can be performed by an exhaust gas having a temperature of 600° C. or below to recover the catalytic activity. Therefore, there is no need for raising the catalyst temperature all the way up to 600° C. or above upon performing the oxidation treatment process. There is an effect in that recovery is easy.

Examples of the alkaline earth metal are Mg, Ca, Sr, Ba, and others. Examples of the rare earth metal are La, Ce, Pr, Nd, and others. The oxide (A-1) may be composed of one or both of the alkaline earth oxide and the rare earth metal oxide, or may further include another oxide other than the alkaline earth oxide and the rare earth metal oxide. The oxide (A-1) may be a compound having a crystal structure such as $ABO_3$ (perovskite), $AB_2O_4$ (spinel), and others.

Examples of the inorganic oxide (A-2) are other than the oxide (A-1), particularly one or more of those selected from a group consisting of $Al_2O_3$, $SiO_2$, $ZrO_2$, $TiO_2$ and zeolite.

Examples of the noble metal may be one or more of those selected from a group consisting of Pt, Pd, Rh and Ir. A preferable amount of the noble metal to be mixed is in a range from 0.1 to 3 g/L. Sufficient catalytic performance can be achieved if the amount of the noble metal to be mixed is 0.1 g/L or above. Increase in cost can be avoided if the amount of the noble metal to be mixed is 3 g/L or below.

The weight ratio of the noble metal B to the oxide (A-1) is 1:10 to 1:300, more preferably 1:30 to 1:200. If the weight ratio of the noble metal B to the oxide (A-1) is 1:10 (preferably 1:30) or above, the noble metal B can hardly exist excessively. Thus, interaction between the oxide (A-1) and the noble metal B is strengthened. Effect in inhibiting coagulation of the noble metal B is enhanced. Also, if the weight ratio of the noble metal B to the oxide (A-1) is 1:300 (preferably 1:200) or below, effect in interaction between the oxide (A-1) and the noble metal B is large. Effect in inhibiting coagulation of the noble metal is enhanced.

(2) The invention according to the second aspect provides the exhaust gas purifying catalyst as set forth in the first aspect wherein the inorganic oxide (A-2) contains one or more of those selected from a group consisting of $Al_2O_3$, $SiO_2$, $ZrO_2$, $TiO_2$ and zeolite.

The exhaust gas purifying catalyst of the present invention can recover the catalytic performance all the more effectively since the inorganic oxide (A-2) is one or more of the above.

(3) The invention according to the third aspect provides a method for recovering an exhaust gas purifying catalyst, which includes an oxidation treatment process that applies an oxidation treatment to the exhaust gas purifying catalyst as set forth in one of the first through third aspects by a lean state exhaust gas and a reduction treatment process that applies a reduction treatment to the exhaust gas purifying catalyst by a rich state exhaust gas.

According to the present invention, the catalytic performance of the exhaust gas purifying catalyst can be recovered.

The lean state indicates a state of excessive air as compared to a stoichiometric state. For example, the A/F ratio is 14.6 or more in the case of a gasoline engine, and 14.5 or more in the case of a diesel engine. The rich state indicates a state of excessive fuel as compared to a stoichiometric state. For example, the A/F ratio is 14.6 or less in the case of a gasoline engine, and 14.5 or less in the case of a diesel engine.

There is no limitation to a time period for which the oxidation treatment process and the reduction treatment process continue. Specifically, the time period for the reduction treatment process may be a spike-like processing time of about 0.1 sec, or may have a long duration of several hours. Patterns of the oxidation treatment process and the reduction treatment process may be as shown in FIGS. 3 and 4, for example, that is, a section of the oxidation treatment process and a section of the reduction treatment process may be periodically switched over at certain timings so that the A/F ratios in each section may be constant. Or, as shown in FIG. 5, the A/F ratio may be periodically changed little by little (for example, according to a sign curve) to form the oxidation treatment process and the reduction treatment process.

The percentage of the time period for which the oxidation treatment process continues in the overall time period for which the recovery method is conducted is preferably in a range of 60 to 80%. The percentage of the time period for which the reduction treatment process continues is preferably in a range of 10 to 30%.

In the reduction treatment process, an exhaust gas under rich conditions by rich spike and S (sulphur) regeneration can be used, for example in the case of the exhaust gas purifying catalyst provided in a direct gasoline injection vehicle. In the case of the exhaust gas purifying catalyst provided in a diesel vehicle, an exhaust gas under rich conditions by post injection, HC addition in exhaust system, rich spike and S regeneration can be used.

(4) The invention according to the fourth aspect provides the method for recovering an exhaust gas purifying catalyst as set forth in the third aspect wherein a temperature of the exhaust gas purifying catalyst in the reduction treatment process is set from 200 to 900° C.

The recovery method of the present invention can increase a reducing action of noble metal and sufficiently recover the catalytic performance since the catalyst temperature in the reduction treatment process is set to 200° C. or above (more preferably 500° C. or above). Also, reducing effect is not decreased by excessive heat since the catalyst temperature in the reduction treatment process is set to 900° C. or below (more preferably 600° C. or below).

(5) The invention according to the fifth aspect provides the method for recovering an exhaust gas purifying catalyst as set forth in the third or fourth aspect wherein a temperature of the exhaust gas purifying catalyst in the oxidation treatment process is set from 200 to 600° C.

The recovery method of the present invention can sufficiently recover the catalytic performance since the catalyst temperature in the oxidation treatment process is set to 200° C. or above (more preferably 300° C. or above). Also, the recovery method of the present invention can execute the oxidation treatment process by an exhaust gas having a temperature of 600° C. or below and recover the catalytic activity since the catalyst temperature in the oxidation treatment process is 600° C. or below (more preferably 500° C. or below). Accordingly, there is no need of raising the catalyst temperature all the way up to 600° C. or above when the oxidation treatment process is performed. There is effect in that recovery is easy.

(6) The invention according to the sixth aspect provides a catalyst system for exhaust gas purification, including the exhaust gas purifying catalyst as set forth in the first or second aspect, a supply unit that supplies an exhaust gas to the exhaust gas purifying catalyst, and a control unit that can control the exhaust gas into either a lean or rich state.

In the catalyst system of the present invention, the exhaust gas may be controlled into a lean state by the control unit to perform the oxidation treatment process to the exhaust gas purifying catalyst. Also, the exhaust gas may be controlled into a rich state to perform the reduction treatment process to the exhaust gas purifying catalyst. That is, the catalyst system of the present invention can maintain the catalytic performance for a long term while recovering the catalytic performance of the exhaust gas purifying catalyst provided therein.

An example of the supply unit may be an internal combustion engine for a gasoline engine and a diesel engine.

An example of the control unit may be a computer that controls the state (rotary torque, for example) of the internal combustion engine.

(7) The invention according to the seventh aspect provides the catalyst system for exhaust gas purification as set forth in the sixth aspect, wherein the control unit controls a temperature of the exhaust gas purifying catalyst into 200 to 900° C. when the exhaust gas is in the rich state.

In the catalyst system of the present invention, the catalyst temperature is 200° C. or above (more preferably 300° C. or above) when the exhaust gas is in the rich state. Thus, a reducing action of noble metal is increased. The catalytic performance can be sufficiently recovered. Also, the catalyst temperature is 900° C. or below (more preferably 600° C. or below) when the exhaust gas is in the rich state. Thus, reducing effect is not decreased by excessive heat.

(8) The invention according to the eighth aspect provides the catalyst system for exhaust gas purification as set forth in the sixth or seventh aspect, wherein the control unit controls a temperature of the exhaust gas purifying catalyst to 200 to 600° C. when the exhaust gas is in the lean state.

In the catalyst system of the present invention, the catalyst temperature is 200° C. or above (more preferably 300° C. or above) when the exhaust gas is in the lean state. Thus, the catalytic performance can be sufficiently recovered. Also, the catalyst temperature is 600° C. or below (more preferably 500° C. or below) when the exhaust gas is in the lean state. Accordingly, the oxidation treatment is performed by an exhaust gas having a temperature of 600° C. or below thereby to recover the catalytic activity. Thus, there is no need of raising the catalyst temperature all the way up to 600° C. or above upon execution of the oxidation treatment. There is effect in that recovery is easy.

EXPLANATION OF REFERENCE NUMERALS

Figure 1:
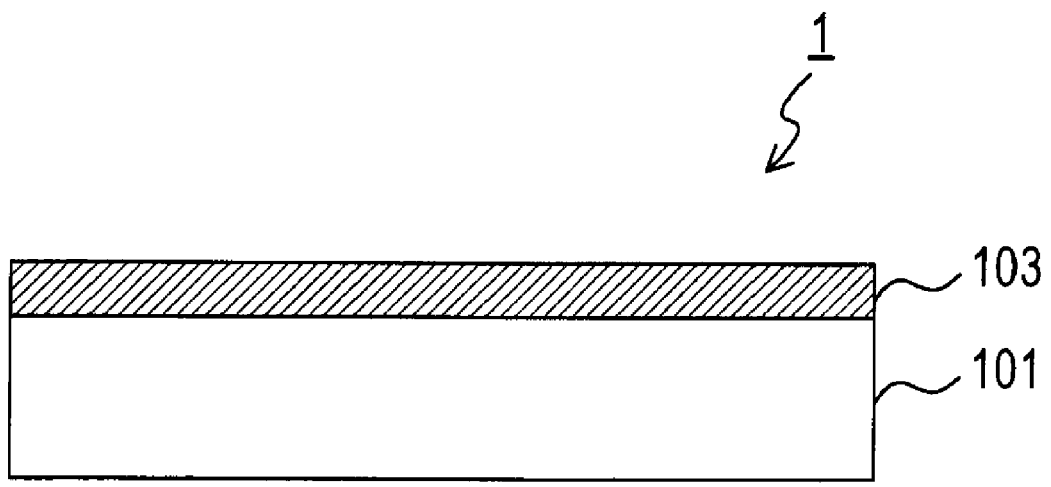
FIG. 1 is a cross sectional view showing a structure of an exhaust gas purifying catalyst 1.

1 . . . exhaust gas purifying catalyst
3 . . . exhaust gas
5 . . . direct injection engine
7 . . . computer
9 . . . catalyst system
101 . . . ceramic honeycomb
103 . . . catalyst coating layer

BEST MODE FOR CARRYING OUT THE INVENTION

The present invention will be particularly explained by way of embodiments.

Embodiment 1

Manufacturing of Exhaust Gas Purifying Catalyst

An aluminum nitrate solution and a Nd nitrate solution were mixed. A 3% ammonia solution was added to the mixed solution little by little so that the pH of the mixed solution is adjusted to a value of 10. A mixture of Al—Nd was coprecipitated by hydrolysis reaction. After decantation is performed with ion-exchanged water, the precipitate and water were separated using a filter press. The precipitate was dried at 80° C. for five hours to remove fluid, and then calcined at 650° C. for an hour to obtain an Al—Nd inorganic oxide containing 20 wt % of Nd.

100 parts by weight of the above oxide, 20 parts by weight of alumina sol (AS200 manufactured by Nissan Chemical Industries, Ltd.) as a binder, a dinitrodiamino Pt acid, 150 parts by weight of ion-exchanged water were mixed and crushed for five hours by a ball mill to prepare a slurry.

The above slurry was applied to coat an approximately 2 L ceramic honeycomb 101 (400 cells/in$^2$) having a diameter of 129 mm and a length of 150 mm, as shown in FIG. 1, to form a catalyst coating layer 103. After dried at 250° C., the catalyst coating layer 103 was calcined at 500° C. for an hour to finish an exhaust gas purifying catalyst 1. A supporting amount of Pt in the catalyst coating layer 103 was 1.5 g/L. A coating amount of the catalyst coating layer 103 was 150 g/L. A weight ratio of Pt to the Nd inorganic oxide in the catalyst coating layer 103 is 1:13.

Embodiment 2

Manufacturing of Exhaust Gas Purifying Catalyst

Based on the Embodiment 1, an exhaust gas purifying catalyst was manufactured using Zr nitrate and Pr nitrate instead of aluminum nitrate and Nd nitrate. An amount of Pr in an inorganic oxide made from Zr nitrate and Pr nitrate was about 30 wt %. In the Embodiment 2, a weight ratio of Pt to the Zr—Pr inorganic oxide is 1:20.

Embodiment 3

Manufacturing of Exhaust Gas Purifying Catalyst

Based on the Embodiment 1, an exhaust gas purifying catalyst was manufactured using Mg nitrate instead of Nd nitrate. An amount of Mg in the inorganic oxide was about 50 wt %. In the Embodiment 3, a weight ratio of Pt to the Mg inorganic oxide is 1:33.

Embodiment 4

Manufacturing of Exhaust Gas Purifying Catalyst

Based on the Embodiment 1, an exhaust gas purifying catalyst was manufactured using Mg nitrate and La nitrate instead of aluminum nitrate and Nd nitrate. An amount of La in an inorganic oxide made from Mg nitrate and La nitrate was about 10 wt %. In the Embodiment 4, a weight ratio of Pt to the Mg—La inorganic oxide is 1:90.

Embodiment 5

Manufacturing of Exhaust Gas Purifying Catalyst

Based on the Embodiment 1, an exhaust gas purifying catalyst was manufactured using a ternary mixing system of Pt nitrate, Pd nitrate and Rh nitrate as noble metal sources, instead of using Pt nitrate alone. Supporting amounts of Pt, Pd and Rh in the finished exhaust gas purifying catalyst were respectively 1.5 g/L, 0.3 g/L and 0.2 g/L. In the Embodiment 5, a weight ratio of the total amount of noble metal (Pt, Pd and Rh) to the Al—Nd inorganic oxide is 1:10.

Embodiment 6

Manufacturing of Exhaust Gas Purifying Catalyst

Based on the Embodiment 1, an exhaust gas purifying catalyst was manufactured using Zr nitrate, Ce nitrate and Mg nitrate instead of aluminum nitrate and Nd nitrate. Relative proportions (mol %) among Zr, Ce and Mg in an inorganic oxide made from Zr nitrate, Ce nitrate and Mg nitrate were 40:40:20. A coating amount was 250 g/L. In the Embodiment 6, a weight ratio of Pt to the Zr—Ce—Mg inorganic oxide is 1:150.

Embodiment 7

Manufacturing of Exhaust Gas Purifying Catalyst 100 parts by powder weight of $SiO_2$ powder (SSA 180 m$^2$/g), 30 parts by weight of Mg oxide (SSA 45 m$^2$/g), 30 parts by weight of alumina sol (AS200 manufactured by Nissan Chemical Industries, Ltd.), 5 parts by weight of acetic acid, and 100 parts by weight of ion-exchanged water were dispersed by an agitator. After addition of a dinitrodiamino Pt acid, the mixture was crushed for five hours by a ball mill to obtain a slurry. The slurry was applied to coat the ceramic honeycomb 101 in the same manner as in the Embodiment 1 to form a catalyst coating layer 103. Thereafter, the catalyst coating layer 103 was dried and calcined to manufacture an exhaust gas purifying catalyst 1 (see FIG. 1). A supporting amount of Pt in the catalyst coating layer 103 was 1.5 g/L. A coating amount of the catalyst coating layer 103 was 150 g/L. A weight ratio of Pt to Mg oxide in the catalyst coating layer 103 is 1:20.

Embodiment 8

Manufacturing of Exhaust Gas Purifying Catalyst

Based on the Embodiment 7, an exhaust gas purifying catalyst was manufactured using 70 parts by weight of zeolite ($SiO_2$—$Al_2O_3$ ratio: 30, SSA 280 $m^2/g$) instead of $SiO_2$ powder and using 50 parts by weight of Nd oxide instead of Mg oxide. In the Embodiment 8, a weight ratio of Pt (1.5 g/L) to Nd oxide is 1:33.

Embodiment 9

Manufacturing of Exhaust Gas Purifying Catalyst

Based on the Embodiment 7, an exhaust gas purifying catalyst was manufactured using 100 parts by weight of Mg oxide (SSA 130 $m^2/g$) added with 10 wt % of $ZrO_2$ instead of $SiO_2$ powder and Mg oxide. In the Embodiment 9, a weight ratio of Pt to Mg oxide is 1:250. A coating amount was 300 g/L. An amount of Pt was 1 g/L.

Comparative Example 1

100 parts by weight of γ alumina (SSA 190 $m^2/g$), 10 parts by weight of boehmite alumina, 200 parts by weight of ion-exchanged water, and a dinitrodiamino Pt acid were mixed and crushed by a ball mill to prepare a slurry having an average particle diameter of 8 μm. The slurry was applied to coat the honeycomb 101 in the same manner as in the Embodiment 1 to form a catalyst coating layer 103. Thereafter, the catalyst coating layer 103 was dried and calcined to manufacture an exhaust gas purifying catalyst. A supporting amount of Pt in the catalyst coating layer 103 was 1.5 g/L. A coating amount of the catalyst coating layer 103 was 150 g/L.

Comparative Example 2

Based on the Embodiment 4, the supporting amount of Pt was made to 2 g/L. The coating amount was made to 100 g/L. In the Comparative Example 2, the weight ratio of noble metal (Pt) to the Mg—La oxide is 1:8.

Comparative Example 3

Based on the Embodiment 4, the supporting amount of Pt was made to 0.5 g/L. The coating amount was made to 200 g/L. In the Comparative Example 3, the weight ratio of noble metal (Pt) to the Mg—La oxide is 1:350.

Embodiment 10 a) Catalyst System

Figure 2:
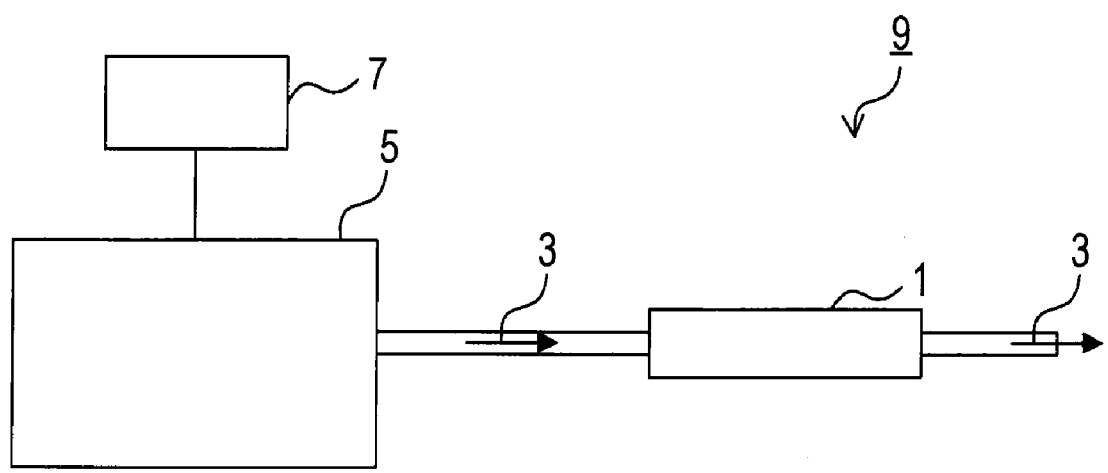
FIG. 2 is a diagram showing a structure of a catalyst system 9.

As shown in FIG. 2, a catalyst system 9 was formed which includes the exhaust gas purifying catalyst 1, a gasoline direct injection engine 5 of 2 L displacement which supplies an exhaust gas 3 to the exhaust gas purifying catalyst 1, and a computer 7 that controls the engine 5 to adjust a temperature (that is, a temperature of the exhaust gas purifying catalyst 1) and an A/F ratio of the exhaust gas 3.

The exhaust gas purifying catalyst 1 provided in the catalyst system 9 is one of those manufactured by the Embodiments 1 to 9 and the Comparative Examples 1 to 3.

b) Durability of Catalyst and Recovery Method (i) Implementation of Durability Test By means of an electric furnace, a 800° C., 10-hour hydrothermal durability test was conducted in an atmosphere containing 10 vol % of water vapor to the exhaust gas purifying catalyst 1.

(ii) Recovery Method

Figure 3:
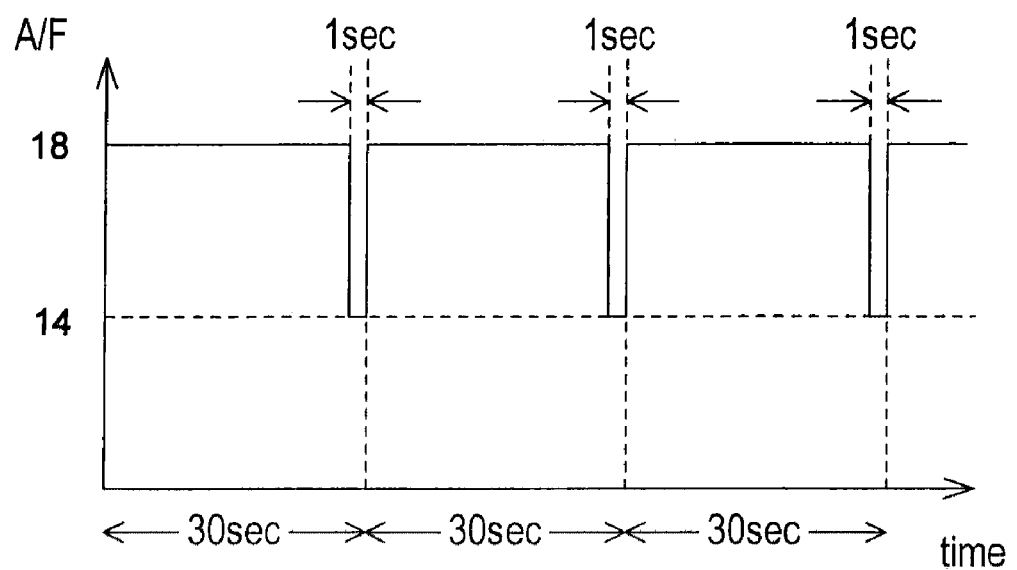
FIG. 3 is an explanatory diagram showing a transition of composition of an exhaust gas when a recovery method is conducted to the exhaust gas purifying catalyst 1.

Thereafter, the catalyst system 9 was driven for 800 hours. At the time, the rotary torque of the engine 5 was adjusted by the computer 7 thereby to set the internal temperature of the exhaust gas purifying catalyst 1 to 500° C. Also, the composition of the exhaust gas 3 was controlled such that a lean state (A/F ratio: 18) basically appears and a spike-like rich state (A/F ratio: 14) having a duration of one second appears at intervals of thirty seconds, as shown in FIG. 3. Here, the oxidation treatment process is performed when the catalyst system 9 is driven such that the exhaust gas 3 is in a lean state. The reduction treatment process is performed when the catalyst system 9 is driven such that the exhaust gas 3 is in a rich state.

c) Evaluation of Exhaust Gas Purifying Catalyst 1

(i) Measurement of Average Particle Diameter of Noble Metal

After the implementation of the recovery method in the above b), average particle diameters of noble metal contained in the exhaust gas purifying catalyst 1 were measured. A TEM (transmission electron microscope) photo of the surface of the exhaust gas purifying catalyst 1 was taken using a TEM. Particle diameters of 300 noble metal particles in the TEM photo were respectively measured. The average particle diameter was calculated by averaging the particle diameters. Table 1 shows the results.

TABLE 1

| | | particle diameter (nm) | | | | | |
|---|---|---|---|---|---|---|---|
| | | Catalyst system, recovery method | | | | | |
| | | Embodiment 10 | Embodiment 11 | Embodiment 12 | Ref. Ex. 1 | Ref. Ex. 2 | Ref. Ex. 3 |
| Catalyst | Embodiment 1 | 3.7 | 2.9 | 3.2 | 27.5 | 29.0 | 26.5 |
| | Embodiment 2 | 3.6 | 3.2 | 2.9 | 29.0 | 28.5 | 27.5 |
| | Embodiment 3 | 2.9 | 3.0 | 2.7 | 29.0 | 28.5 | 28.0 |
| | Embodiment 4 | 3.5 | 3.0 | 2.5 | 29.0 | 26.0 | 29.0 |
| | Embodiment 5 | 3.0 | 2.8 | 2.6 | 28.5 | 29.0 | 28.0 |
| | Embodiment 6 | 2.8 | 2.7 | 2.8 | 26.0 | 27.5 | 27.0 |
| | Embodiment 7 | 3.7 | 1.9 | 2.9 | 27.5 | 27.5 | 27.5 |
| | Embodiment 8 | 3.3 | 2.6 | 2.7 | 28.0 | 29.0 | 29.0 |
| | Embodiment 9 | 3.7 | 3.7 | 2.9 | 28.5 | 29.0 | 28.5 |
| | Comp. Ex. 1 | 32.0 | 33.0 | 34.0 | 31.0 | 29.0 | 30.0 |

TABLE 1-continued

| | particle diameter (nm) | | | | | |
|---|---|---|---|---|---|---|
| | Catalyst system, recovery method | | | | | |
| | Embodiment 10 | Embodiment 11 | Embodiment 12 | Ref. Ex. 1 | Ref. Ex. 2 | Ref. Ex. 3 |
| Comp. Ex. 2 | 11.2 | 11.4 | 11.1 | 26.1 | 25.7 | 25.0 |
| Comp. Ex. 3 | 18.7 | 19.4 | 19.4 | 28.1 | 29.1 | 29.2 |

As shown in Table 1, the average particle diameters of noble metal in the exhaust gas purifying catalysts according to the Embodiments 1 through 9 were very small. In contrast, the average particle diameters of noble metal in the exhaust gas purifying catalysts according to the Comparative Examples 1 through 3 were very large. These results show that coagulation of noble metal is removed by the implementation of the recovery method so that the catalytic performance is recovered in the exhaust gas purifying catalysts 1 according to the Embodiments 1 through 9.

(ii) Evaluation of Purification Performance

After the implementation of the recovery method of the above b), the exhaust gas purifying catalyst 1 was attached to a direct injection engine of 2 L displacement to run the engine. The rotary torque of the engine was adjusted so that a gas temperature entering the exhaust gas purifying catalyst 1 is 200° C. By means of an exhaust gas analyzer manufactured by HORIBA, Ltd., a CO concentration C1 at the engine exit (that is, upstream of the exhaust gas purifying catalyst 1) and a CO concentration C2 at the exit of the exhaust gas purifying catalyst 1 were respectively measured. The purification rate was calculated in accordance with Equation (1) below.

$$\text{purification rate (\%)} = ((C1-C2)/C1) \times 100 \quad \text{Equation (1)}$$

Table 2 shows the measurement results.

TABLE 2

| | | CO purification rate (%) at 200° C. | | | | | |
|---|---|---|---|---|---|---|---|
| | | Catalyst system, recovery method | | | | | |
| | | Embodiment 10 | Embodiment 11 | Embodiment 12 | Ref. Ex. 1 | Ref. Ex. 2 | Ref. Ex. 3 |
| Catalyst | Embodiment 1 | 89 | 91 | 90 | 24 | 20 | 25 |
| | Embodiment 2 | 91 | 91 | 89 | 23 | 19 | 24 |
| | Embodiment 3 | 92 | 90 | 89 | 22 | 21 | 26 |
| | Embodiment 4 | 90 | 89 | 91 | 24 | 22 | 27 |
| | Embodiment 5 | 93 | 90 | 92 | 24 | 20 | 23 |
| | Embodiment 6 | 87 | 92 | 89 | 24 | 19 | 21 |
| | Embodiment 7 | 86 | 91 | 93 | 22 | 29 | 25 |
| | Embodiment 8 | 91 | 89 | 90 | 21 | 18 | 24 |
| | Embodiment 9 | 90 | 92 | 89 | 19 | 20 | 25 |
| | Comp. Ex. 1 | 18 | 17 | 19 | 21 | 20 | 18 |
| | Comp. Ex. 2 | 32 | 35 | 41 | 20 | 20 | 19 |
| | Comp. Ex. 3 | 45 | 47 | 44 | 37 | 32 | 30 |

As shown in Table 2, CO purification rates of the exhaust gas purifying catalysts 1 according to the Embodiments 1 through 9 were much higher than those of the Comparative Examples 1 through 3.

Embodiment 11 a) Catalyst System

In principle, the catalyst system 9 was constituted in the same manner as in a) of the Embodiment 10. In the Embodiment 11, a diesel engine (turbointercooled engine of common rail type) of 2.2 L displacement was used as the engine 5.

b) Durability of Catalyst and Recovery Method (i) Implementation of Durability Test A hydrothermal durability test was conducted in the same manner as in b)(i) of the Embodiment 10.

(ii) Recovery Method

Figure 4:
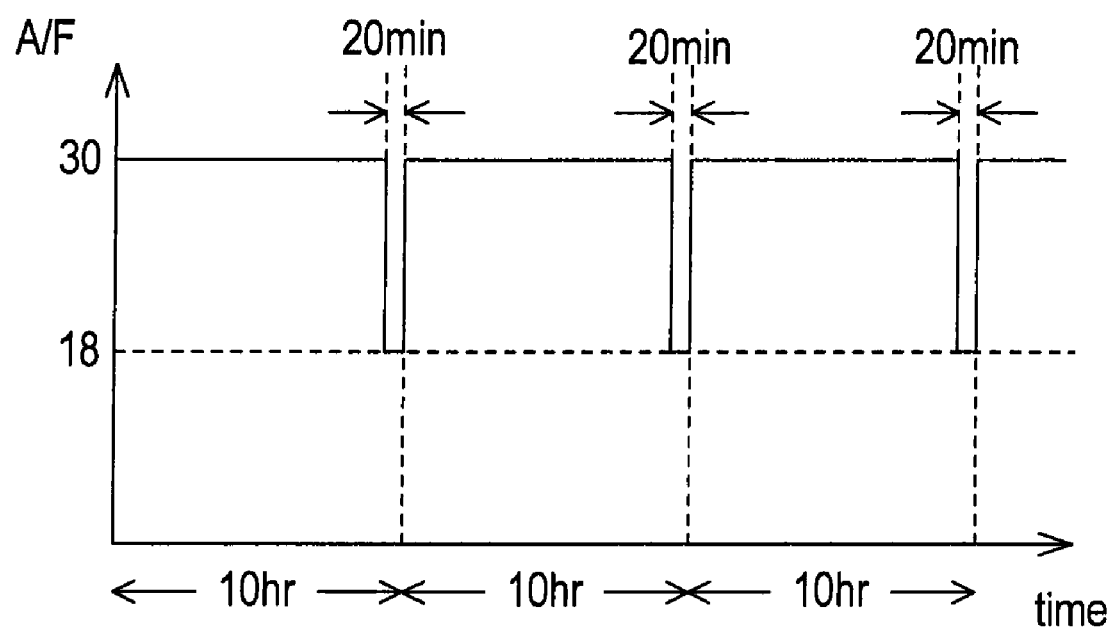
FIG. 4 is an explanatory diagram showing a transition of composition of an exhaust gas when a recovery method is conducted to the exhaust gas purifying catalyst 1.
Figure 5:
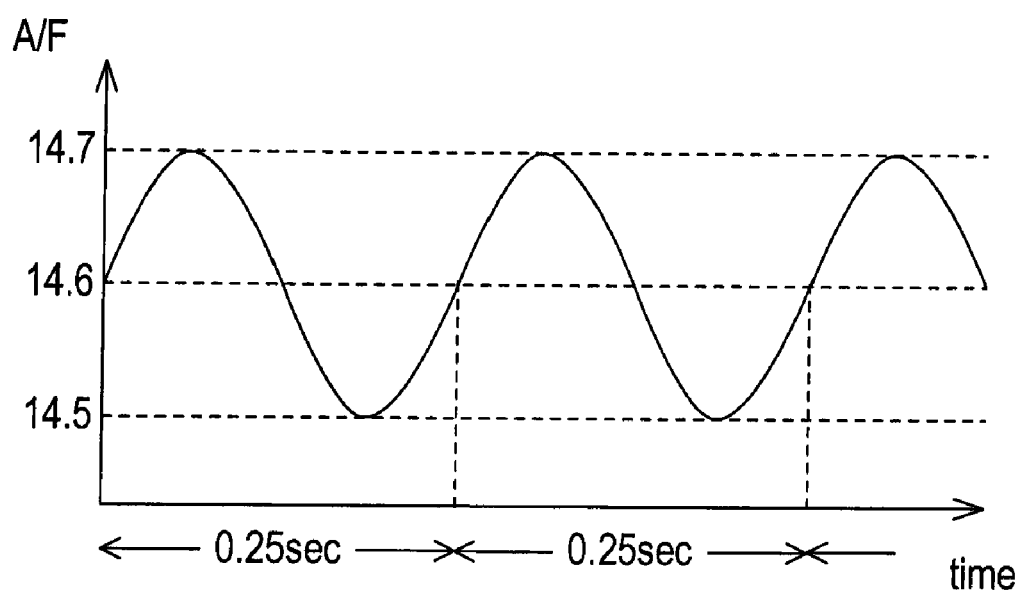
FIG. 5 is an explanatory diagram showing a transition of composition of an exhaust gas when a recovery method is conducted to the exhaust gas purifying catalyst 1.

Thereafter, the catalyst system 9 was driven for 1000 hours. At the time, the rotary torque of the engine 5 was adjusted by the computer 7 thereby to set the internal temperature of the exhaust gas purifying catalyst 1 to 300° C. Also, the composition of the exhaust gas 3 was controlled such that the A/F ratio is basically 30 and that a state having a duration of twenty minutes and the A/F ratio of 18 appears at intervals of 10 hours, as shown in FIG. 4. Here, the oxidation treatment process is performed in the state having the A/F ratio of 30. The reduction treatment process is performed in the state having the A/F ratio of 18.

c) Evaluation of Exhaust Gas Purifying Catalyst 1

Average particle diameters of noble metal and purification rates were measured in the same manner as in c) of the Embodiment 10. The results are shown in the above Tables 1 and 2.

As shown in Table 1, the average particle diameters of noble metal in the exhaust gas purifying catalysts 1 according to the Embodiments 1 through 9 were very small. In contrast, the average particle diameters of noble metal in the exhaust gas purifying catalysts 1 according to the Comparative Examples 1 through 3 were very large. This indicates that coagulation of noble metal particles is removed by the implementation of the recovery method so that the catalytic performance is recovered in the exhaust gas purifying catalysts 1 according to the Embodiments 1 through 9.

Also as shown in Table 2, the CO purification rates of the exhaust gas purifying catalysts 1 according to the Embodiments 1 through 9 were much higher than those of the Comparative Examples 1 through 3.

Embodiment 12 a) Catalyst System

In principle, the catalyst system 9 was constituted in the same manner as in a) of the Embodiment 10. In the Embodiment 12, a gasoline engine of 2.4 L displacement was used as the engine 5.

b) Durability of Catalyst and Recovery Method (i) Implementation of Durability Test
The same hydrothermal durability test as in b)(i) of the Embodiment 10 was conducted.
(ii) Recovery Method
Thereafter, the catalyst system 9 was driven for 50 hours. At the time, the rotary torque of the engine 5 was adjusted by the computer 7 thereby to set the internal temperature of the exhaust gas purifying catalyst 1 to 650° C. Also, the composition off the exhaust gas 3 was controlled such that the center value of the A/F ratio is 14.6 and that the A/F ratio fluctuates in accordance with a sign curve having a frequency of 4 Hz and an amplitude of 0.2.

c) Evaluation of Exhaust Gas Purifying Catalyst 1

Average particle diameters of noble metal and purification rates were measured in the same manner as in c) of the Embodiment 10. The results are shown in the above Tables 1 and 2.

As shown in Table 1, the average particle diameters of noble metal in the exhaust gas purifying catalysts 1 according to the Embodiments 1 through 9 were very small. In contrast, the average particle diameters of noble metal in the exhaust gas purifying catalysts 1 according to the Comparative Examples 1 through 3 were very large. This indicates that coagulation of noble metal particles is removed by the implementation of the recovery method so that the catalytic performance is recovered in the exhaust gas purifying catalysts 1 according to the Embodiments 1 through 9.

Also as shown in Table 2, the CO purification rates of the exhaust gas purifying catalysts 1 according to the Embodiments 1 through 9 were much higher than those of the Comparative Examples 1 through 3.

Reference Example 1

After the same hydrothermal duration test as in b) (i) of the Embodiment 10 was conducted to the catalyst system 9 of the Embodiment 10, the catalyst system 9 was driven for 800 hours. The driving conditions were basically the same as those in b)(ii) of the Embodiment 10. The composition of the exhaust gas 3 was kept lean (A/F ratio: 18) from beginning to end.

Thereafter, in the same manner as in c) of the Embodiment 10, average particle diameters of noble metal and purification rates were measured. The results were shown in the above Tables 1 and 2.

As shown in Table 1, the average particle diameters of noble metal in the recovery method according to the Reference Example 1 were larger than those in the recovery method according to the Embodiment 10. This indicates that noble metal particles are coagulated so that the catalytic performance is not recovered in the recovery method according to the Reference Example 1.

Also as shown in Table 2, the recovery method according to the Embodiment 10 is more effective in recovering the CO purification rates of the exhaust gas purifying catalysts than the recovery method according to the Reference Example 1.

Reference Example 2

After the same hydrothermal duration test as in b)(i) of the Embodiment 10 was conducted to the catalyst system 9 of the Embodiment 11, the catalyst system 9 was driven for 1000 hours. The driving conditions were basically the same as those in b)(ii) of the Embodiment 11. The composition of the exhaust gas 3 was kept such that the A/F ratio is 30 from beginning to end.

Thereafter, in the same manner as in c) of the Embodiment 10, average particle diameters of noble metal and purification rates were measured. The results were shown in the above Tables 1 and 2.

As shown in Table 1, the average particle diameters of noble metal in the recovery method according to the Reference Example 2 were larger than those in the recovery method according to the Embodiment 11. This indicates that noble metal particles are coagulated so that the catalytic performance is not recovered in the recovery method according to the Reference Example 2.

Also as shown in Table 2, the recovery method according to the Embodiment 11 is more effective in recovering the CO purification rates of the exhaust gas purifying catalysts than the recovery method according to the Reference Example 2.

Reference Example 3

After the same hydrothermal duration test as in b) (i) of the Embodiment 10 was conducted to the catalyst system 9 of the Embodiment 12, the catalyst system 9 was driven for 50 hours. The driving conditions were basically the same as those in b)(ii) of the Embodiment 12. The composition of the exhaust gas 3 was kept lean (A/F ratio: 23) from beginning to end.

Thereafter, in the same manner as in c) of the Embodiment 10, average particle diameters of noble metal and purification rates were measured. The results were shown in the above Tables 1 and 2.

As shown in Table 1, the average particle diameters of noble metal in the recovery method according to the Reference Example 3 were larger than those in the recovery method according to the Embodiment 12. This indicates that noble metal particles are coagulated so that the catalytic performance is not recovered in the recovery method according to the Reference Example 3.

Also as shown in Table 2, the recovery method according to the Embodiment 12 is more effective in recovering the CO purification rates of the exhaust gas purifying catalysts than the recovery method according to the Reference Example 1.

It is to be understood that the present invention should not be limited to the above described embodiments, but may be practiced in various forms within the scope not departing from the present invention.

The invention claimed is:
1. An exhaust gas purifying catalyst, which inhibits coagulation of noble metal particles during gas purification, comprising:

a combined oxide (A) containing a first oxide (A-1) containing an alkaline earth metal and/or a rare earth metal and an inorganic second oxide (A-2); and a noble metal (B) supported by the combined oxide (A), wherein a weight ratio of the noble metal (B) to the first oxide (A-1) containing the alkaline earth metal and/or the rare earth metal is from 1:90 to 1:200 so that the exhaust gas purifying catalyst inhibits coagulation of the noble metal particles during the gas purification; and the first oxide (A-1) containing the alkaline earth metal and/or the rare earth metal is selected from the group consisting of neodymium oxide, praseodymium oxide and a combination of both magnesium oxide and lanthanum oxide.

2. The exhaust gas purifying catalyst according to claim 1, wherein the inorganic oxide (A-2) contains one or more of compounds selected from a group consisting of $Al_2O_3$, $SiO_2$, $ZrO_2$, $TiO_2$ and zeolite.

3. An exhaust gas purifying catalyst, which inhibits coagulation of noble metal particles during gas purification, comprising:

a combined oxide (A) containing a first oxide (A-1) containing an alkaline earth metal and/or a rare earth metal and an inorganic second oxide (A-2); and a noble metal (B) supported by the combined oxide (A), wherein a weight ratio of the noble metal (B) to the first oxide (A-1) containing the alkaline earth metal and/or the rare earth metal is from 1:90 to 1:200 so that the exhaust gas purifying catalyst inhibits coagulation of the noble metal particles during the gas purification.

4. The exhaust gas purifying catalyst according to claim 1, wherein the noble metal (B), the first oxide (A-1) and the second oxide (A-2) on the catalyst are prepared to form a common slurry, whereby the noble metal (B) and combined oxide (A) form a substantially uniform mixture.

5. The exhaust gas purifying catalyst according to claim 2, wherein the first oxide (A-1) containing the alkaline earth metal and/or the rare earth metal contains one or more of compounds selected from a group consisting of magnesium oxide, calcium oxide, barium oxide, lanthanum oxide, and neodymium oxide.

6. The exhaust gas purifying catalyst according to claim 3, wherein the first oxide (A-1) containing the alkaline earth metal and/or the rare earth metal contains one compound selected from a group consisting of magnesium oxide, calcium oxide, barium oxide, strontium oxide, lanthanum oxide, praseodymium oxide and neodymium oxide.

7. The exhaust gas purifying catalyst according to claim 3, wherein the first oxide (A-1) containing the alkaline earth metal and/or the rare earth metal contains at least one compound selected from the group consisting of beryllium oxide, magnesium oxide, calcium oxide, barium oxide, radium oxide, lanthanum oxide, neodymium oxide, scandium oxide, yttrium oxide, praseodymium oxide, promethium oxide, samarium oxide, europium oxide, gadolinium oxide, terbium oxide, dysprosium oxide, holmium oxide, erbium oxide, thulium oxide, ytterbium oxide and lutetium oxide.

8. The exhaust gas purifying catalyst according to claim 3, wherein the first oxide (A-1) containing the alkaline earth metal and/or the rare earth metal contains one compound selected from a group consisting the beryllium oxide, magnesium oxide, calcium oxide, barium oxide, radium oxide, lanthanum oxide, strontium oxide, praseodymium oxide, neodymium oxide, scandium oxide, yttrium oxide, praseodymium oxide, promethium oxide, samarium oxide, europium oxide, gadolinium oxide, terbium oxide, dysprosium oxide, holmium oxide, erbium oxide, thulium oxide, ytterbium oxide, and lutetium oxide.

9. The exhaust gas purifying catalyst according to claim 3, wherein the first oxide (A-1) containing the alkaline earth metal and/or the rare earth metal is neodymium oxide.

10. The exhaust gas purifying catalyst according to claim 3, wherein the first oxide (A-1) containing the alkaline earth metal and/or the rare earth metal is praseodymium oxide.

11. The exhaust gas purifying catalyst according to claim 3, wherein the first oxide (A-1) containing the alkaline earth metal and/or the rare earth metal is magnesium oxide.

12. The exhaust gas purifying catalyst according to claim 3, wherein the first oxide (A-1) containing the alkaline earth metal and/or the rare earth metal is a combination of both magnesium oxide and lanthanum oxide.

13. The exhaust gas purifying catalyst according to claim 3, wherein the first oxide (A-1) containing the alkaline earth metal and/or the rare earth metal is a combination of both magnesium oxide and cerium oxide.

14. An exhaust gas purifying catalyst, which inhibits coagulation of noble metal particles during gas purification, comprising:

a combined oxide (A) containing neodymium oxide (A-1) and an inorganic second oxide (A-2), the inorganic second oxide (A-2) comprising at least one oxide selected from the group consisting of $Al_2O_3$, $SiO_2$, $ZrO_2$, $TiO_2$ and zeolite; and a noble metal (B) supported by the combined oxide (A), the noble metal (B) being at least one element selected from the group consisting of Pt, Pd and Rh; and a weight ratio of the noble metal (B) to the neodymium oxide (A-1) is from 1:90 to 1:200 such that the exhaust gas purifying catalyst inhibits coagulation of the noble metal particles during the gas purification.

* * * * *